C. W. HERMANCE.
STEAM ROAD WAGON.
No. 4,311 Fig 1. Reissued Mar. 28, 1871.
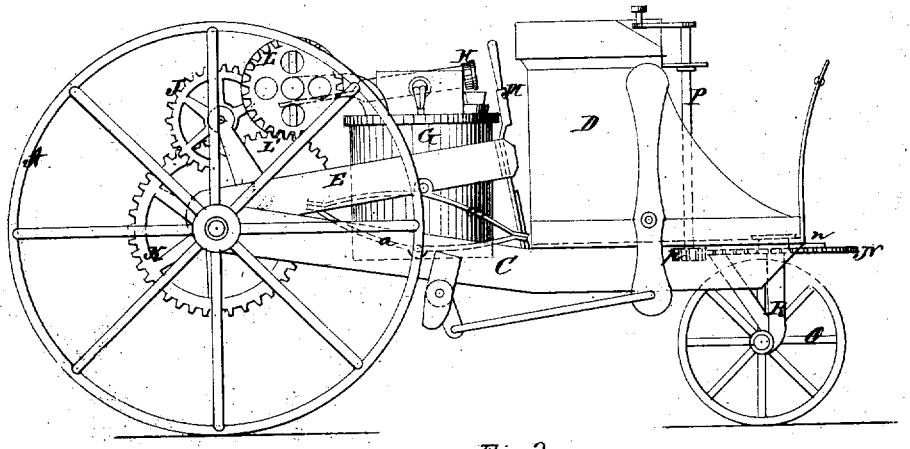
Fig 2
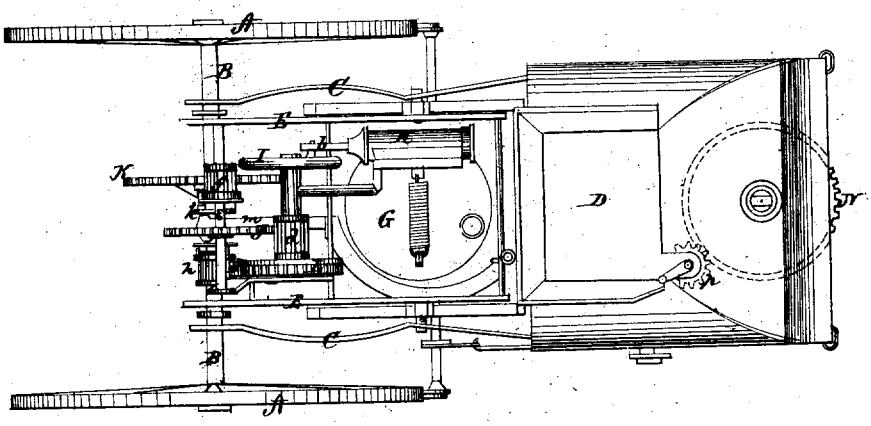
Witnesses.
C. L. Evert.
Jas. E. Hutchinson
Inventor.
Chas. W. Hermance
per
Alexander Mason
Attys.

UNITED STATES PATENT OFFICE.

CHARLES W. HERMANCE, OF SCHUYLERSVILLE, NEW YORK.

IMPROVEMENT IN STEAM ROAD-WAGONS.

Specification forming part of Letters Patent No. 111,644, dated February 7, 1871; Reissue No. 4,311, dated March 28, 1871.

*To all whom it may concern:*

Be it known that I, CHARLES W. HERMANCE, of Schuylersville, in the county of Saratoga, and in the State of New York, have invented certain new and useful Improvements in Steam-Wagons; and I do hereby declare that the following is a full, clear, and exact description thereof, reference being had to the accompanying drawings, and to the letters of reference marked thereon, making a part of this specification.

The nature and object of my invention consists in the construction and arrangement of the mechanism necessary for the propelling of vehicles on common roads by steam in such a manner as to best secure strength, speed, and power combined, as well as safety to the various working parts, as will be hereinafter more fully shown and described.

The result of my invention is, first, so constructing and suspending, in connection with wagons before mentioned, the boiler, engine, and machinery attached thereto as will allow of all necessary vertical motion, thereby preventing injury to the same in consequence of the rough or uneven condition of the road without interfering with the adjustment of those parts necessary for the most perfect and complete operation of engines used for such purposes; second, the arrangement of a double train of gearing, in combination with steam-wagons, which shall be positive in their operation, occupying but little space, and subject to such changes, with facility, as will instantly convert power into speed and speed into power to meet the demands and conditions of the road without altering the speed of the piston or the power of the engine; third, the construction and arrangement of a frame for the guiding-wheel in such a manner that the journal-bearings of said wheel shall be back of the center of the perpendicular frame through which the wheel revolves, and which also holds it in upright position, thereby obviating all liability of the wheel suddenly turning sidewise, in consequence of obstruction on the road, when running at high speed.

In order to enable others skilled in the art to which my invention appertains to make and use the same, I will now proceed to describe its construction and operation, referring to the annexed drawings, in which—

Figure 1 is a side elevation, and Fig. 2 is a plan view, of my steam road-wagon.

A A represent the hind wheels of my wagon, placed upon the ends of the axle B.

C C are two beams attached to the axle B at suitable points, and upon the front parts of which the wagon-body D rests.

Upon the axle B is hinged the rear end of a frame, E, the front end of which rests upon springs *a a*, said springs being attached to the beams C C in any suitable manner in rear of the body D. The boiler, engine, and machinery are all attached to the frame E, which frame thus suspends these parts, permitting of all necessary vertical motion of the same, thereby relieving them from all injurious shocks and concussions they would otherwise receive in being propelled over rough and uneven roads.

G represents the boiler, which is attached in any suitable manner to the front end of the frame E. On the top of the boiler is an oscillating or other engine, H, the piston-rod *b* of which connects with a wrist-pin upon the fly-wheel I. The engine and boiler may be of any suitable form or construction, with single or double cylinders, and connecting with a fly-wheel or a crank-shaft, as may be desired.

A pinion, *d*, is placed on the fly-wheel shaft, which pinion gears with and turns a cog-wheel, J, mounted upon a shaft, *e*. This shaft has its bearings in arms attached to the frame E in such a manner that the shaft *e* will be almost directly above and parallel with the axle B.

On the shaft *e* is a pinion, *f*, which gears with and turns a large cog-wheel, K, mounted loosely upon the axle B.

On the fly-wheel shaft is also mounted a cog-wheel, L, which, by means of an intermediate cog-wheel, L′, communicates motion to a loose pinion, *h*, on the axle B.

Between the cog-wheel K and pinion *h*, on the axle B, is placed a clutch, *k*, which may be made to engage with either said wheel or pinion. The clutch *k* is so arranged that when it is revolved by being thrown in contact with the revolving wheel K or pinion *h* it will turn the axle with it, and thus propel the wagon.

It will readily be seen that when the clutch engages with the cog-wheel K the wagon will be propelled at a certain rate of speed; but as soon as the clutch is changed, so as to engage with the pinion *h*, this speed is greatly augmented without any change in the speed of the piston or the power of the engine. In the first case there will be more power and less speed, and in the second case more speed but less power; or, in other words, by the mere changing of the clutch *k*, without any change whatever in the engine, power can be converted into speed and speed into power. The clutch, or, as it also may be called, "chuck" *k*, is connected by means of a rod, *m*, with a lever, M, pivoted at the front end of the frame E. By the use of this lever the change of the position of the clutch is readily effected. When the clutch is moved so as to engage with neither the cog-wheel K nor pinion *h*, then of course the wagon will remain stationary, although the engine may be in motion.

It will be noticed that the frame E and springs *a a* not only suspend the boiler, engine, and machinery, as above described, but also allow of a vertical motion to the same between the axle and parts which they support, without ungearing itself or changing the distance between the axle and engines.

Immediately under the front end of the body D is placed a circle, *n*, through the center of which and through the bottom of the body D passes a hollow journal or hub of a cog-wheel, N, placed against the under side of the circle *n*. To the under side of this cog-wheel is attached a perpendicular frame, R, the lower end of which is turned or extended toward the rear, and forms journal-bearings for the wheel O, upon which the front end of the wagon is supported.

By arranging the frame R so as to bring the journal-bearings of the wheel O back of the center of said frame I obviate all liability of the wheel turning suddenly sidewise, in consequence of obstructions on the road, when running at high speed. This device, known as a "caster-wheel" or "caster-bearing," is always positive in its operation, and will always move in a direct line, unless changed by the device attached for that purpose.

Within and through the body D passes an upright shaft, P, with a crank at its upper end and a pinion, *p*, at its lower end, said pinion engaging with the cog-wheel O, so that by this means the vehicle is readily steered or direction given to it while in motion.

I do not confine myself to the location of the front or guiding wheel directly under the wagon-body, as it can also be placed with a suitable frame immediately in front of the carriage, and will thus permit the use of a larger wheel, which is always preferable for high rates of speed.

I also provide my wagon with a suitable brake, as shown in the drawings.

Having thus fully described my invention, what I claim as new, and desire to secure by Letters Patent, is—

1. The horizontal frame E, or its equivalent, attached at one end to the rear axle and resting upon springs at the other, thereby suspending the boiler, engine, and machinery, and permitting of all necessary vertical motion of the same between the axle and parts which they support, substantially as and for the purposes herein set forth.

2. The springs *a a*, or their equivalents, attached to or supporting the front of the horizontal frame E, which suspends the boiler and machinery, for the purposes set forth.

3. In a steam-wagon, a double train of gears, or their equivalents, in combination with the boiler and engine, with single or double cylinders connecting with fly-wheel and crank-shaft, for the purposes herein set forth.

4. In combination with the double train of gears, a movable clutch, *k*, attached to the axle and operated by a lever, M, and rod *m*, for the purpose of changing the speed, as herein set forth.

5. The horizontal frame E and springs *a a*, or any other device that shall operate as their equivalents to suspend the boiler, engine, or machinery, and allow of vertical motion to the same between the axle and parts which they support without ungearing itself or changing the distance between the axle and cylinders, as herein set forth.

In testimony that I claim the foregoing I have hereunto set my hand and seal this 16th day of February, 1871.

CHAS. W. HERMANCE. [L. S.]

Witnesses:
J. H. DE RIDDER,
ROBERT HERMANCE.